3,984,362
Date: Oct. 5, 1976

United States Patent [19]
Sirianni et al.

[54] REINFORCING POLYMERS WITH LAUNDERED AMORPHOUS LIGNIN

[75] Inventors: Aurelio Frederick Sirianni; Ira Edwin Puddington, both of Ottawa, Canada

[73] Assignee: Canadian Patents and Development Limited, Ottawa, Canada

[22] Filed: June 5, 1974

[21] Appl. No.: 476,712

Related U.S. Application Data

[62] Division of Ser. No. 245,356, April 19, 1972, Pat. No. 3,817,974.

[52] U.S. Cl. .............................. 260/17.5; 260/762
[51] Int. Cl.² ................... C08H 5/02; C08L 7/00; C08L 9/00; C08L 97/00
[58] Field of Search ................................ 260/17.5

[56] References Cited
UNITED STATES PATENTS

| | | | |
|---|---|---|---|
| 3,163,614 | 12/1964 | Dimitri | 260/17.5 |
| 3,223,697 | 12/1965 | Ball et al. | 260/124 |
| 3,247,135 | 4/1966 | Doughty | 260/17.5 |
| 3,808,192 | 4/1974 | Dimitri | 260/124 R |

Primary Examiner—Donald E. Czaja
Assistant Examiner—E. A. Nielsen
Attorney, Agent, or Firm—Alan A. Thomson

[57] ABSTRACT

Lignin of improved reinforcing properties in polymers, is prepared by steps comprising:

a. laundering crude lignin in an aqueous medium, b. reforming the lignin at a pH of about 2 to about 3 at a temperature of about 88° to 95°C, and c. washing the reformed precipitate to remove soluble material and drying the resulting solids.

Polymer latices can be added before final pecipitation and the lignin-latex coprecipitated. The lignin can be milled directly into rubber to give good ultimate tensile strengths. This lignin can also be used as a reactive reinforcing filler in plastics.

10 Claims, 1 Drawing Figure

FIG. 1

REINFORCING POLYMERS WITH LAUNDERED AMORPHOUS LIGNIN

This application is a divisional of Application Ser. No. 245,356 filed Apr. 19, 1972 (issued to U.S. Pat. No. 3,817,974 on June 18, 1974.

This invention provides a method for the preparation of very amorphous lignin products of high purity from crude lignin materials of industrial origin, and including the lignins separated from residual wood pulp liquors (particularly the "black" liquors). The purified lignin products prepared by this method impart reinforcement to styrene-butadiene rubber (SBR) and other analogous natural and synthetic rubbers at least as good as obtained with present lignin-latex coprecipitates. The tensile strengths attained for the vulcanizates compare favourably with the reinforcing carbon black containing rubbers.

It is well known that lignin obtained from the waste black liquors, coprecipitated with styrene-butadiene rubber (SBR) latex, imparts very desirable physical properties to the vulcanizate. In comparison to carbon black, it is less dense, non-conducting, and being lighter in color, it appears more amenable for the preparation of light-colored rubber compounds. Difficulties have been encountered in filtration, and a two-step heat treatment was necessary to get acceptable filtering rates for the coprecipitate. Slow drying of the lignin-rubber crumb rendered masterbatch production unattractive economically. Transportation cost of either latex or black liquor was another deterrent to the widespread use of coprecipitate. Thus, "the one disadvantage to the wide spread use of lignin as a reinforcing agent for rubber is the necessity of coprecipitaing it with the rubber from the latex", (India Rubber World Vol. 124 page 178 May 1951 by J. J. Keilen, W. K. Dougherty and W. R. Cook).

Early attempts to mill dry lignin into SBR masterbatch were unsuccessful, It was felt for a long time that "no lignin of any type will reinforce if it is added as a dry powder and milled with rubber ", (Canadian Chemical Processing, Vol. 43 April 1959 page 37). "Dry lignin milled into rubber shows almost no reinforcing effect. This is believed to be a result of the lignin particles adhering together by hydrogen bonding and thus not being dispersed into the rubber by milling" (see O. W. Burke Jr. in Reinforcement of Elastomers, edited by Gerard Krause, Interscience Publishers, copyright (1965) p. 506).

The adherence of the lignin particles together on milling is possibly owing to several unforeseen factors:

a. Condensation of the lignin particles if subjected to too high a temperature (before or after precipitation), b. Precipitation of the sodium lignate at a temperature at which clusters of lignin, although very finely divided, can close-pack in aqueous suspension and adhere strongly together on drying, and c. The presence of a non-lignin constituent or perhaps a low molecular weight fraction in the isolated crude lignin. This constituent could prevent the lignin from dispersing into the SBR on milling by acting as an agglomerating or coupling agent, and promoting clustering of the lignin particles rather than their dispersion.

It was found possible to remove detrimental material according to this invention and leave behind a product of a highly amorphous nature that was very suitable for reinforcing SBR. The desirable product was formed provided the purified sodium lignate was precipitated with acid over rather narrow pH and elevated temperature ranges. Usually the "impurity" can be observed as ruby colored globules when the crude lignin is heated between two microscope cover glasses. With further heating the globules spread to a continuous film on the surface of the glass. As indicated in Table 1, the population of these globules decreases while the sintering temperature of the lignin and the tensile strength of the vulcanizate increases with increased "purity" of the lignin.

TABLE I

| Lignin | Tens. Str. (psi) | Lignin Melt. Temp. °C | Impurity Globules |
|---|---|---|---|
| Untreated Indulin AT | 500 | 205 | Copious |
| Indulin AT* | 2300 | 210 | Fewer |
| Indulin AT* | 2800 | 214 | Very few |
| Indulin AT* | 3100 | 221 | None |

*Treated similarly to Example 1 below, but to give progressively increased laundering.

The non-lignin portion of the crude commercial product is not completely separated by merely dissolving the lignin in alkali and regenerating it in the acid form by precipitation with a mineral acid in the usual fashion. We have now found that a preliminary extraction, leaching or laundering is required to remove non-lignin materials which are detrimental.

According to the invention a purified lignin product has been prepared which, when cold milled into rubber formulations over a prolonged period of time, shows no enlargement or agglomeration of the lignin particles which would lead to lower tensile strengths of the vulcanizate. The method involves preparation of water-insoluble lignin from crude lignin in which water-soluble, or water-dispersible impurities, or constituents, are separated from the crude material without degrading substantially the reinforcing constituent of the lignin (followed by a final precipitation or conditioning at critical temperature and pH).

The process includes the optional use of water-soluble polar organic emulsifiers such as acetone, lower alkanols (e.g. methanol, propanol), triethanolamine, and the like, or bicarbonates (e.g. $NaHCO_3$, $KHCO_3$) as an aid in the removal of water-soluble, or water-dispersible portions of the crude lignin during the laundering step. These agents are added to the aqueous lignin suspension, and are believed to act as wetting agents or emulsifiers for impurities. Salts such as sodium chloride or sodium sulfate may be used to minimize leaching or poor filtering of the lignin itself. A preferred variation of the laundering or soaking is the pH adjustment of the crude lignin suspension to below about pH 6, preferably to about pH 2.5, using an acid such as hydrochloric, phosphoric, formic, acetic and the like, but preferably sulfuric, and allowing the system to soak desirably for at least 2 ½ hours.

The most critical step in the process is the final lignin precipitation (or conditioning of the final wet precipitate before drying). The highly amorphous lignin of improved reinforcing properties was found to be obtained only when the reconstitution or reformation took place at from about 88°–95°C and at a pH of about 2 to 3. Preferably the following separation or filtration should be at this temperature. Both the upper and lower temperature limit was important but may vary slightly for different types of lignin or for lignins fo different process history. Substantially equivalent results were obtained at a pH of 2.5–3 with close to 3 being preferred for reagent economy. If either the laundering or purification step or the controlled final precipitation, reformation or conditioning step is omitted, the improved reinforcement will not be obtained.

The method includes the optional use of alkaline salts such as sodium silicate, sodium borate or trisodium phosphate as dispersants for the impurities in the lignin during the final precipitation of the lignin.

Various types of lignins may be used in the preparation of the novel lignin products of improved reinforcing properties. Crude lignins from sulphite liquors, and modified lignosulphonates have been processed. A further aspect of this invention is the separation of novel lignin products from Spruce black liquors, and from various other Kraft black liquors using a stepwise pH adjustment before final conditioning at pH 2–3, in which the purified lignin product obtained has enhanced reinforcing properties.

The initial separation of lignin from black liquors preferably includes centrifuging off insolubles, heating the solution and lowering the pH until the lignin precipitates, cooling, filtering and washing the lignin precipitates. Desirably the lignin is initially recovered by heating the crude pulp liquor to about 80°–92°C. centrifuging, reheating to said temperature and precipitating the lignin.

The use of liquid dispersing agents such as vinylic silanes, or fatty acid esters, has been found to aid in the more efficient milling of the novel lignin product into rubber.

Unexpectedly it was found that improved reinforcing properties were still obtained if the final lignin precipitation was a coprecipitation with rubber latex. The same temperature and pH limitations were found necessary for the lignin-latex coprecipitation as for the final lignin precipitation or conditioning. An advantage in compounding was obtained if a mixture, slurry, wet cake, or paste of compounding additives was intimately mixed with the wet coprecipitate before drying (subsequent milling time was greatly reduced).

In the attached drawing.

The lignin products were evaluated using the following recipe. In some cases it was prepared in sufficient quantity to be used as a masterbatch.

| A | Krylene 1500 (Polymer Corp. Sarnia, Ont. trade name for an SBR rubber) | 100 parts (by weight) |
|---|---|---|
| | PBNA (Phenyl-beta-naphthylamine) | 2 parts |
| | Litharge | 2 parts |
| | Altax (trademark for benzothiazyl disulfide) | 1 part |
| | Cumate (trademark for Cu dimethyldithiocarbamate) | 0.3 parts |
| | Stearic acid | 2 parts |
| | Sulfur | 2 parts |

Masterbatch A — enough for 25–30 individual tests was mixed on a 12 inch open mill. The material was rolled and covered with aluminum foil, while being stored at room temperature.

Milling of Lignin into Masterbatch

Portions of about 114 g. of the rubber masterbatch were milled and blended on a 12 inch open mill with the following ingredients:

| B | Silane A174 (gammamethacryloxypropyl trimethoxysilane-Union Carbide Corp.) | 2 parts (by weight) |
|---|---|---|
| | Lignin | 40 parts |
| | Circosol 2XH ( or 42-40 processing oil - Sun Oil Co.) | 5 parts |
| | Zinc Oxide | 5 parts |

The rubber masterbatch was sheeted, and the silane was dispersed into it by milling. Then followed the addition of 40 g. lignin, the oil and finally the zinc oxide. The systems was milled for approximately 10 minutes. The approximate time of cure at 275°F was obtained by means of a Shawbury Curometer, (H. W. Wallace and Co. Ltd.). The sample was then passed through the mill 6 times, and an 80 g. portion was cured at 275°F for this time under 1500 psi pressure. The cured specimen was chilled under water, stored at room temperature for 1 hour or longer, then tested for tensile strength as per A.S.T.M. No. D412-68.

Lignin from a number of sources was used in illustrating this invention. Indulin AT was obtained in 50 pound bags from Westvaco Chemical Products, Charleston, W. Virginia, U.S.A. Its specification is as follows:

| Moisture | 6% |
|---|---|
| Ash | 1.5% |
| pH | 5.0 – 7.5 |
| Packed apparent density | 25 lb/cu ft. |
| Surface area | (average 3.49 sq. meters/gram) |
| Methoxyl content | 13.9% |
| Sulfur | 1.4% |
| Sintering point | 410°F(210°C) |

Additionally, lignin known as "Tomlinite" was obtained from Domtar Research Ltd., Senneville, Quebec, and a heat-modified Kraft lignin from Industrial Cellulose Research (C.I.P.) Hawkesbury, Ontario. Spruce Kraft black liquor containing about 10% by weight of lignin, obtained from Domtar Research Ltd.; and Kraft black liquor and a heat modified Kraft black liquor each containing about 5% lignin obtained from C.I.P. Hawkesbury; were also employed. A sample of an oxidized desulphonated lignosulfonate insoluble under acid conditions obtained from the Ontario Pulp and Paper Co., Thorold, Ontario, was also used as a raw material for illustrating this invention.

These lignins of industrial origin including Indulin AT and Tomlinite; and the experimental types including the heat-modified dry Kraft lignin contained unspecified amounts of a material, seemingly non-lignin in nature, as an impurity. It is probable that this impurity consists of small amounts of resins, waxes, esters, acids, polysaccharides, and other organics including some alkali-insolubles which are not completely separated after acidification of the liquors.

In the case of Indulin AT, the color of the lignin and the pH is aqueous suspension usually varied from bag to bag. Indulin AT appeared to fall, for the purpose of treatment by this invention, into several groups.

Group A

Indulin AT having pH's which range up to about pH 6, when 50 to 200 g. lignin are soaked or dispersed in 2–3 l. of water overnight. These lignins were thermally stable, in that, it was possible to heat the lignin in aqueous suspensions up to a temperature of 95°C. in order to remove water-soluble or-dispersible impurities according to the invention.

Group B

Indulin AT having a pH greater than 6 after the soaking in water. The thermal stability was poor owing to high solubility in hot water. The lignin shrank badly when precipitated in the same fashion as the group A lignins.

Group C

Indulin AT having a pH greater than 6 after the soaking in water. It contained a larger quantity of water-extractable material than the lignins from Group A or Group B. On precipitation it behaved similarly to Group A Indulin AT.

It was discovered that all of these crude lignins produce excellent reinforcement after the purification pretreatment and final precipitation or conditioning. The steps involved comprise:

a. laundering crude lignin in an aqueous medium until substantial amounts of non-lignin material are solubilized and separated, b. reforming the lignin by one of (i) precipitating 20 with acid at a pH of about 2 to about 3 at a temperature of about 88° to 95°C; and (ii) conditioning wet lignin precipitate at said pH and said temperature, and c. washing the precipitate to remove soluble material and drying the resulting solids.

The following Examples illustrate various aspects of the invention.

EXAMPLE 1

Samples of 60 and 200 g. Indulin AT were soaked in 3 l. of water at room temperature. The pH of the lignin suspensions 30 was adjusted below about pH 6 preferably to pH 2.5, with acid. The suspensions were allowed to soak, leach or launder at room temperature overnight, preferably longer. The strawish-colored supernatant liquid was decanted or filtered after the soaking or leaching period. The residue was dispersed in fresh water and heated while stirring at various temperatures up to 95°C, and these suspensions filtered immediately while hot. The 60 g. quantities were heated in about 3.5 l. of water, while the 200 g. lots were heated in about 8 l. of water. The filter cake was rinsed with warm water until the filtrate was clear in each case, and again dispersed in fresh water. While stirring and heating, the lignin was dissolved with 10% sodium hydroxide based on the original weight of the lignin, then precipitated at a specific temperature with sulfuric or hydrochloric acid by reducing the pH from about 11 to pH 3 – 2.5. The 60 g. lots were precipitated while stirring in 3.5 l of water with the 200 g. lots in about 8 – 12 l. of water. The lignin suspension was filtered immediately after precipitation and the filter cake rinsed with warm water to remove excess salts. The filter cake, the pH of which rises quickly to about pH 4 following the water rinsing step, was dried at about 130°F to 180°F in a forced air oven.

Although the lignin could be washed after the soaking step at up to about 95°C. without any deleterious effects, purified lignin products possessing good reinforcing properties were obtained only if the precipitation step was carried out between about 88°–95°C (see Ex. 2). The non-sticky precipitate filtered easily and dried quickly when the precipitation was carried out over this narrow temperature range. About 80 – 87% of the original weight of the lignin was recovered in a highly amorphous form (according to X-ray diffraction measurements) containing less than 1% moisture. The high amorphicity of the lignin decreased sharply when the precipitations were done outside of this temperature range (88°–95°C.).

EXAMPLE 2

Effect of the final precipitation temperature on the tensile strength of the vulcanizate A marked increase in the reinforcing properties of lignin was observed after the isolated lignin was laundered, dissolved with alkali, then precipitated with a mineral acid preferably at about 92°C. from about pH 11 down to about pH 3.

Figure 1:
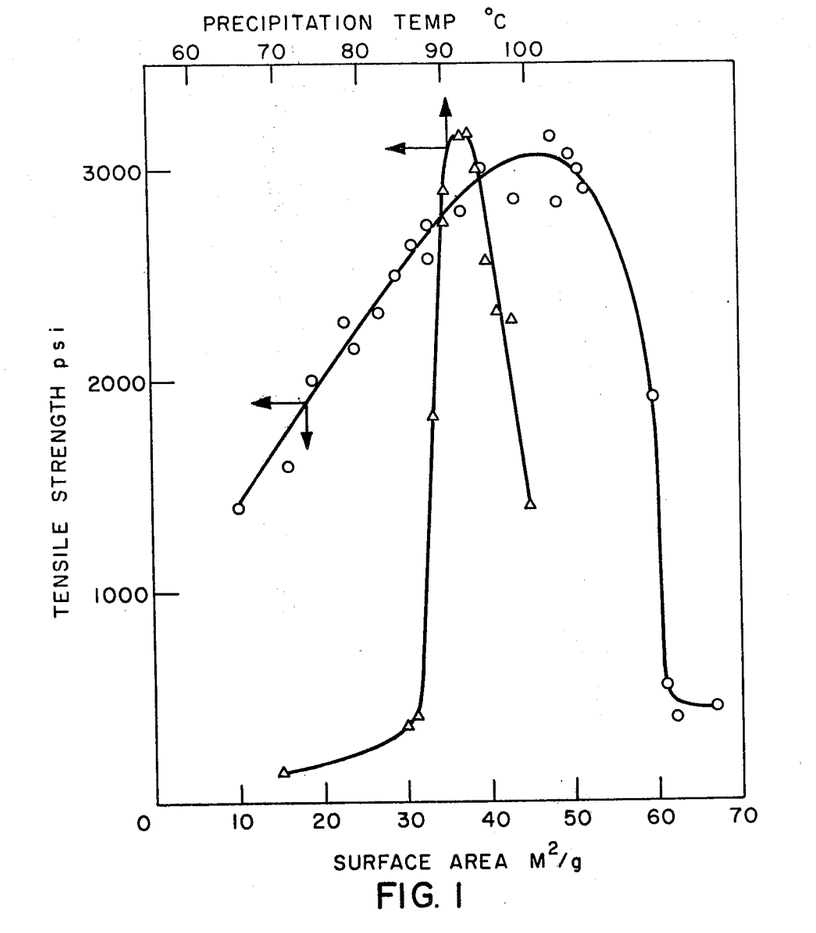
FIG. 1 is a graph showing the effects of the final precipitation or conditioning temperature, and the lignin surface area on vulcanizate tensile strength.

The following Example illustrates that amorphous lignin products possessing desirable reinforcing properties were obtained when the precipitations were carried out over a temperature range between about 88° to 95°C. As shown in Table II and in FIG. 1, decreases in tensile strength occurred outside this temperature range. Precipitates formed below 88° to 89°C. appeared to be feathery and dried to a rather compact form with a higher surface area. The filtration rate decreased with decreasing precipitation temperature. Lignin products obtained by precipitation above about 95°C. also showed lower reinforcing properties (the filtering rate is high however). The decrease in reinforcing properties is possibly owing to the irreversible condensation or shrinkage of lignin particles. Between 88°–95°C.. both the filtration and drying of the filter cake is rapid. Suspensions containing 200 g. lignin in about 10 – 12 l. of water filtered in less than 4 minutes under vacuum, using a 33 cm. dia. creped filter paper. The lignin dried to an amorphous product even at room temperature. A smear of the filter cake dried to a fine power within several minuted without checking or distortion. This possibly signifies that a lignin "aerogel" type of product was produced.

Although the possibility of precipitating the lignin solution at a lower temperature, then heating the wet precipitate up to the critical temperature range of 88°–95°C. is not excluded, the product obtained under these conditions does not appear to be quite as good a reinforcing material. While the reason for this is not too clear, it is probably owing to occlusion of impurities, or perhaps to the close packing of lignin particles during the desolvation step, or over-riping owing to the longer heating cycle.

TABLE II

Effect of Precipitation Temperature (P. Temp.) on Tensile Strength of SBR Vulcanizate

| °C P. Temp. | M²/g Surface Area | Cure Time Min. | Modulus at 300% | $T_B$ (psi) | $E_B$ | H | Additive during Precipitation |
|---|---|---|---|---|---|---|---|
| 70 | — | 10 | 65 | 160 | 870 | 36 | with sodium silicate |
| 85 | 60.6 | 30 | 300 | 360 | 410 | 53 | no sodium silicate |
| 86 | 62.5 | 20 | 310 | 400 | 440 | 55 | with sodium silicate |
| 88.5 | 59.4 | 25 | 425 | 1825 | 770 | 56 | '' |
| 60–91* | — | 27 | 420 | 2500 | 790 | 56 | '' |
| 92–91 | 48.5 | 33 | 425 | 2925 | 790 | 60 | '' |
| 90 | — | 25 | 420 | 2760 | 830 | 58 | no sodium silicate |
| 90 | — | 30 | 450 | 2900 | 770 | 58 | with sodium silicate |
| 91–92 | — | 30 | 450 | 3000 | 830 | 58 | '' |
| 91–92*** | — | 25 | 440 | 3000 | 830 | 57 | '' |
| 91–92*** | — | 30 | 480 | 3250 | 770 | 58 | '' |
| 93 | 48.3 | 30 | 440 | 3170 | 820 | 59 | '' |
| 92 | 50.1 | 33 | 425 | 3075 | 800 | 59 | '' |
| 92 | 48.7 | 33 | 425 | 3150 | 810 | 60 | '' |
| 92 | 36.9 | 33 | 450 | 2800 | 790 | 56 | no sodium silicate |
| 94 | — | 30 | 385 | 3010 | 800 | 59 | with Borax |
| 95 | 34.2 | 25 | 400 | 2575 | 760 | 59 | with sodium silicate |
| 98 | 22.9 | 30 | 400 | 2250 | 810 | 55 | '' |
| 85–96** | — | 25 | 400 | 2325 | 840 | 55 | no sodium silicate |
| 100 | 10.3 | 30 | 340 | 1410 | 790 | 50 | with sodium silicate |

Note:
*The sodium lignate was precipitated at 60°C then heated up to 91°C and filtered immediately
**The sodium lignate was precipitated at 85°C then heated up to 96°C and filtered immediately
***In lieu of silane, methyl dichlorostearate was used in milling
$T_B$ Tensile strength at break
$E_B$ Elongation at break (%)
H Shore "A" hardness

EXAMPLE 3

A series of experiments was carried out with Indulin AT from group A in order to show the effect of the water washing temperature (W.W.T.) of the raw lignin and precipitation temperature on the tensile strength ($T_B$) of the vulcanizate. About 200 g. of lignin were soaked at room temperature in 3 l. of water for 3 days. After filtration, the lignin was dissolved in a alkali sufficient to give a pH of about 11, and the temperature raised to 92°C. The lignin solution was precipitated quickly with a suitable quantity of dilute hydrochloric acid (the pH of the system was reduced from about 11 to pH 2.5 – 3.0 at 92°C). Tensile strengths were found to increase slightly with increasing laundering temperatures, reaching a maximum at about 92°C, then decreasing above 95°C. Some irreversible "degradation" of the lignin was indicated when the lignin suspension was heated in water above about 95°C.

EXAMPLE 4

Lignin products of improved reinforcing properties are obtained when the precipitation of laundered or leached lignin is carried out in the presence of alkaline salts such as "N" grade sodium silicate, borax or trisodium phosphate. These salts are used as an aid in further depressing water-soluble or dispersible impurities from becoming bound with the precipitated lignin. The alkaline salts are added to the lignin suspension with the sodium hydroxide used to dissolve the lignin or shortly afterwards. About 4–5% $SiO_2$ as sodium silicate, 2–3% anhydrous borax or 2–3% trisodium phosphate based on the original weight of the lignin, were used. The presence of these salts allowed a further laundering effect to be obtained during the final precipitation or conditioning (and washing).

The physical properties of the vulcanizate obtained as a function of the W.W.T. and alkaline salt used are shown in Table III. The lignin solutions were precipitated at about 92°C using hydrochloric acid to pH of about 3.

TABLE III

Physical Properties of Vulcanizates Using Lignin Precipitated in the Presence of Alkaline Salts

| Cure Time Min. | Modulus at 300% | $T_B$ (psi) | $E_B$ | H | °C W.W.T. | Precip. Temp.°C | Salt Used |
|---|---|---|---|---|---|---|---|
| 25 | 390 | 2875 | 810 | 60 | 92 | 92 | Na Silicate |
| 25 | 450 | 2940 | 750 | 61 | 92 | 92 | '' |
| 30 | 385 | 3010 | 800 | 59 | 92 | 94 | Borax |
| 35 | 440 | 2875 | 760 | 59 | — | — | Borax |
| 30 | 450 | 2750 | 770 | 61 | 92 | 92 | $Na_3PO_4$ |

EXAMPLE 5

Group B, Indulin AT had pH values greater tha 6 when 60 – 200 g. of the raw material was soaked in about 3 l. of water at room temperature. The supernatant liquid after soaking and the filtrate from the water washing treatment was much darker than from the lignin samples having a pH less than 6. However, the reprecipitated lignin product obtained was not much better than untreated material. Some improvement occurred by processing this lignin under standard conditions with a blanket of nitrogen. The reason for the low tensile strengths observed for the vulcanizates containing lignin from Group B is probably due to fractionation and/or degradation of the lignin. Samples treated under identical conditions without the water soaking step were slightly better, provided the pH was lowered below 6 in the water washing step. However very amorphous lignin was produced by acidifying the aqueous crude lignin (Group B) suspensions during the soaking operation to a pH below 6, then following the precedure developed for Group A lignins. An illustration of the method employed to accommodate Group B lignin is as follows:

About 60 g. Indulin AT (Group B) were soaked in 2 l. of water for about 2 weeks at room temperature. The pH of the aqueous suspension was adjusted with phosphoric acid to the following values: Natural pH (above 6) as control, 6.0, 5.3, 3.8, 3.2, 1.9, 2.6 and 2.9. Another sample was prepared without soaking in which the pH of the suspension was adjusted to about pH 3.6 in the water washing step.

The supernatant soak liquid was decanted. The residue was dispersed in fresh water in a 4 l. beaker, and while stirring was heated under nitrogen up to about 61°–90°C. (W.W.T.). The suspension was filtered immediately. The filter cake was rinsed under suction with about 2 l. of warm water. The filter cake was dispersed in 3 l. of fresh water at 30°C. and the lignin dissolved with a sodium hydroxide solution containing 6 g. alkali and 8 g. sodium silicate. The solution was heated with steam and under nitrogen. While stirring the solution was precipitated with dilute hydrochloric acid at about 92°C. from about pH 11 to pH 2.9. The precipitate was filtered immediately. The filter cake was rinsed 4 times with one l. of warm water each time. The lignin products dried to less tha 1% moisture at 130°F, overnight.

Relationship found between the pH in which the lignin was soaked and tensile strength of the vulcanizates is shown in Table IV.

to pH 4 or over. About 85% by weight of the original lignin was recovered in an amorphous purified state. The physical properties obtained for the vulcanizate and the surface area of the lignin used are summarized in Table V. Surface Areas were measured by nitrogen adsorption using a Strohlein Area Meter. The pH during soaking or laundering was 2–3 in all cases.

TABLE V

| | Physical Properties of SBR Vulcanizates and Surface Areas of Lignins Used | | | | |
|---|---|---|---|---|---|
| Cure Time Min. | Modulus at 300% | $T_B$ | $E_B$ | H | $M^2/g$ Surface Area |
| 30 | 400 | 3170 | 820 | 59 | 48.3 |
| 35 | 490 | 3010 | 760 | 62 | 48.3 |
| 30 | 385 | 2950 | 850 | 57 | 50.1 |
| 33 | 425 | 3075 | 800 | 59 | 50.1 |
| 30 | 380 | 3000 | 850 | 56 | 48.7 |
| 33 | 425 | 3150 | 810 | 60 | 48.7 |
| 30* | 450 | 2900 | 830 | 58 | 51.5* |

Note:
*Sodium lignate solution was finally precipitated with dilute sulfuric acid to pH 3 at 92°C.

Lignin products which reinforced SBR to at least 2900 psi were obtained from all bags of Indulin AT and from other raw Kraft dry lignins by the method just described.

EXAMPLE 7

Modified Lignin Soaking Treatment

Desirable amorphous reinforcing lignin products

TABLE IV

| | Physical properties of vulcanizates as a function of "initial" pH in the soaking step | | | | | | | |
|---|---|---|---|---|---|---|---|---|
| pH Soaking | W.W.T. °C | % Lignin recov. | Surface Area $M^2/g$ | Time of Cure Min. | Modulus 300% | $T_B$ | $E_B$ | H |
| 7.8 (Natural) | 90.5 | 80 | 67 | 30 | 300 | 450 | 530 | 55 |
| No soaking (control) | 86 (pH 3.6) | 78.3 | — | 20 | 300 | 1250 | 830 | 53 |
| 6.0 | 86 | 85.7 | — | 25 | 365 | 1875 | 790 | 54 |
| 5.3 | 25 | 86.8 | — | 30 | 380 | 2870 | 830 | 56 |
| 3.8 | 86 | 87.0 | — | 30 | 450 | 2900 | 770 | 58 |
| 3.2 | 86 | 86.6 | — | 30 | 340 | 2950 | 870 | 54 |
| 1.9* | 86 | 85.0 | 36.9 | 30 | 345 | 2850 | 850 | 54* |
| 1.9 | 61 | 85 | 48.3 | 30 | 440 | 3170 | 820 | 59 |
| | | | | 35 | 490 | 3010 | 760 | 62 |
| 2.6* | 61 | 84 | 51.5 | 30 | 450 | 2900 | 830 | 58* |
| 2.9** | 90.5 | 85 | — | 33 | 460 | 2800 | 790 | 56** |

*Sulfuric acid used to precipitate the lignin solution.
**The lignin solution was precipitated in the absence of sodium silicate.

EXAMPLE 6

Other bags of Indulin AT from Group B behaved in the same fashion. For example, a number of experiments were conducted using 200 g. lignin batches from other bags. The raw lignin was soaked for about 3 weeks in 3 l. of water containing 12 ml. 20% $H_2SO_4$. The supernatant liquid at about pH 2 – 3 was decanted. The residue was heated in 10 l. of water under nitrogen up to about 60°C and filtered. The filter cake was rinsed with warm water until the filtrate was virtually clear. Following this, the filter cake was dispersed in 8 l. of water at about 50°–60°C., and the lignin dissolved with a solution containing 20 g. sodium hydroxide and 32 g. sodium silicate. The solution was heated while stirring and precipitated with dilute hydrochloric acid by reducing the pH from 11 to about 3.0 at 92°–93°C. The suspension filtered within 4 minutes under suction, using a 33 cm. dia. creped filter paper. The filter cake was rinsed with 4 washes of 3 l. each of warm water and 2 rinses of 800 ml. distilled water. The final pH of the filter cake after the removal of excess salts rose quickly were also obtained from Indulin AT when small quantities of acetone, methanol, triethanolamine, or sodium bicarbonate were used with the lignin in the soaking treatment.

As an illustration of this technique, about 200 g. Indulin AT from Group C were soaked in 3 l. of water at room temperature overnight. The lignin suspension was adjusted from about pH 7.5 down to pH 2.5 with sulfuric acid. The suspension was agitated in the presence of 40 ml. acetone for 2 hours, then filtered. The filter cake was rinsed with water at 50°–60°C. the residue was dissolved with sodium hydroxide in the presence of sodium silicate. The solution was precipitated at 92°C. with dilute hydrochloric acid in the usual fashion. A similar illustration was provided by using 25 ml. methanol in lieu of acetone. Another illustration of this method was carried out using 200 g. Indulin AT from Group A in which 5 ml. triethanolamine were added to the suspension in lieu of acetone or methanol.

Another illustration is provided as fillows: About 200 g. Indulin AT from Group B were soaked in 3.5 l. of water containing 2 g. sodium bicarbonate, overnight.

The pH was then lowered down to 2.5 with sulfuric acid. The lignin was filtered and the filter cake was washed with tap water at room temperature until the filtrate was virtually clear. The lignin was dissolved with sodium hydroxide and precipitated in the usual way with dilute hydrochloric acid from pH 11 down to pH 3 at about 92°C.

Typical results obtained are summarized in Table VI.

TABLE VI

Physical Properties of SBR Vulcanizates Filled with Lignin Products Obtained From Modified Soaking Procedure

| Cure Time Min. | Modulus at 300% | $T_B$ (psi) | $E_B$ | H | Laundering Additive |
|---|---|---|---|---|---|
| 30 | 450 | 2925 | 790 | 58 | Acetone |
| 30 | 390 | 2700 | 810 | 56 | Methanol |
| 30 | 375 | 2960 | 850 | 56 | Triethanolamine |
| 30* | 400 | 2885 | 800 | 57* | Sodium Bicarbonate |

Note:
*No sodium silicate used

EXAMPLE 8

A Kraft modified lignin obtained from C.I.P. Hawkesbury was soaked in Water, filtered hot (90°C), washed, redispersed in water and dissolved by sodium hydroxide - sodium silicate addition. The solution was heated and the lignin precipitated with acid from pH 11 down to pH 2.8 at 93°C, filtered and the precipitate washed and dried. About 82% of the original weight of the lignin was recovered in a very amorphous form which had similar reinforcing properties to Indulin AT treated according to the invention.

EXAMPLE 9

A crude lignin designated Tomlinite (obtained from Domtar Research Ltd.) was treated as above similarly to Indulin AT from Group A. The properties of the vulcanizate containing this treated lignin were similar to those of vulcanizate reinforced with the treated Indulin AT.

EXAMPLE 10

Illustrative example using a desulphonated lignosulphonate lignin in the form of the sodium salt obtained from the Ontario Paper Co.

About 100 g. of this crude lignin were laundered as above for Group B Indulin At (see Example 5). The filter cake was dispersed in 3 l. of water and the lignin dissolved while heating in the presence of 10 g. NaOH and 16 g. N grade sodium silicate. The solution was precipitated while stirring with dilute hydrochloric acid by decreasing the pH from about 11 down to pH 2.9 at 92°C. The suspension was filtered immediately and the filter cake rinsed with warm water to wash off excess salts. The filter cake was dried at 180°F in a forced air oven overnight. The vulcanizate results obtained are:

TABLE VII

| Cure at 275°F. | Modulus (300%) | $T_B$ | $E_B$ | H |
|---|---|---|---|---|
| 30 | 490 | 2300 | 670 | 57 |

Further curing was not attempted.

EXAMPLE 11

Effect of Milling Time on the Physical Properties of the Vulcanizates

The amorphous lignin products produced by this method possess remarkable stability. These products can be milled with SBR without the lignin particles clustering together in the rubber. This indicates that impurities believed responsible for the adherence of the lignin particles together are removed by the water washing or laundering step.

As an illustration, about 436 g. of the standard masterbatch was milled with 8 g. silane A174, 160 g. lignin and 40 g. Circosol 42–40. As the material was being milled, 4 aliquot quantities of the mixture were removed after 15, 25, 40 and 55 minute millings. Each sample removed was milled for a further 5 minute period with 5 g. zinc oxide. The rubber sample was sheeted and an 80 g. sample was cured for 30 minutes at 275°F. The tensile strength attained for the vulcanizate as a function of milling time is summarized in Table VIII.

TABLE VIII

| Milling Time Min. | Modulus at 300% | $T_B$ (psi) | $E_B$ | H |
|---|---|---|---|---|
| 20 | 450 | 2800 | 770 | 59 |
| 30 | 430 | 2980 | 800 | 59 |
| 45 | 445 | 2980 | 800 | 59 |
| 60 | 390 | 3000 | 820 | 59 |

This invention includes the separation from various black liquors of the lignin in a dry highly amorphous form possessing very desirable reinforcing properties for SBR or other rubbers. The lignin can be separated from the black liquor by acidification with a mineral acid. If the black liquor is treated with $CO_2$ or carbonic acid, the lignin is precipitated in the form of a salt at about pH 9 - 10. After the addition of a small quantity of a salt such as sodium chloride or sodium sulfate to the black liquor, non-lignin material soluble in the alkaline media is removed on filtration. The lignin is sufficiently salted out that filtering of the suspension occurs at a reasonable rate without blinding the filter. The filter cake is rinsed with cold water, then suspended in water and the lignin precipitated at 85° to 90°C. with a mineral acid to about pH 4. The lignin is filtered and rinsed with hot water. The filter cake is redispersed in water and the pH of the suspension adjusted to about pH 3 for final conditioning at about 92°C. The lignin product is then filtered, washed with warm water to remove excess salts, and dried.

EXAMPLE 12

Illustrative example in which Domtar Spruce black liquor is centrifuged then precipitated with $CO_2$.

About 3700 ml. Spruce black liquor were heated up to 99°C. while stirring in the presence of 10 g. sodium chloride. After cooling to room temperature the black liquor was diluted with 800 ml water. The solution was centrifuged in order to separate out insolubles. The centrifuged liquid fraction was heated up to 88°C. then $CO_2$ bubbled through the solution while cooling to room temperature. The precipitate (at about pH 9.4) was filtered at room temperature. The filter cake was rinsed with cold water.

An aliquot portion of the filter cake was dispersed in about 8 l. of water containing 20 g. sodium silicate. The lignin dispersion was heated up to 85°C., and the lignin was precipitated by acidification to about pH 4.1 using 10 % sulfuric acid. the suspension was filtered immediately and the filter cake rinsed with warm water. The rinsed filter cake was redispersed in about 8 l. of water and heated while stirring under nitrogen up to 85°C., filtered and rinsed with warm water until the filtrate was clear. The lignin was again dispersed in 8 l. of fresh water, heated up to 92°C. and the pH adjusted from about pH 5.0 down to pH 2.9 with dilute hydrochloric acid. The suspension was filtered immediately and rinsed with warm water. The washed filter cake, at about pH 4.5, was dried at 130°F. overnight. As an illustration a similar example was prepared in the same fashion in the absence of sodium silicate.

The physical properties of the vulcanizates reinforced with these products were:

TABLE IX

| Cure at 275°F. | 300% Mod. | $T_B$ | $E_B$ | H | |
|---|---|---|---|---|---|
| 30 | 380 | 2820 | 850 | 55 | Sodium silicate used |
| 30 | 345 | 2400 | 820 | 54 | no Sodium Silicate used |
| 35 | 385 | 2490 | 810 | 55 | |

EXAMPLE 13

A series of experiments were done with Indulin AT from the same bag in which the water washing and precipitation temperatures were held constant at about 92°C. The pH of the suspension in the final acidification of the lignin solution was varied.

About 50 g. crude lignin were soaked in 3 l. of water for about 20 hours, the lignin filtered and the residue heated in 3 l. of fresh water up to 92°C. The lignin was filtered immediately, and rinsed under suction with warm water. The filter cake was dispersed in 3 l. of water and the lignin dissolved with 5 g. NaOH. The sodium lignate solutions were precipitated at 92°C to pH values ranging from about 1.8 to about 4. After rinsing the filter cake substantially free of salts, the lignin was dried at about 180°F for about 20 hours. The maximum tensiles were observed where the lignin solutions were acidified to pH 2.7 to 3.0 at 92°C.

By setting the tensile strength at 100 % for the lignin prepared at pH 2.7 to 3.0, the tensile strengths of the vulcanizates reinforced with lignin prepared at other pH values are shown below as a percentage of this figure:

TABLE X

| pH | $T_B\%$ |
|---|---|
| 2.7 – 3.0 | 100 |
| 1.8 | 81 |
| 2.4 | 90 |
| 3.4 | 74 |

TABLE X-continued

| pH | $T_B\%$ |
|---|---|
| 4.0 | 76 |

EXAMPLE 14

Illustrative example using CIP Kraft black liquor. The lignin 30 product was obtained by a stepwise decrease in pH.

About 3000 ml. black liquor were heated in the presence of 10 g. sodium chloride up to 95°C. After cooling to room temperature any surface film, when formed, was usually skimmed off. The black liquor was steam-heated up to 88°C; then while cooling $CO_2$ was bubbled through the system in order to precipitate the lignin. The suspension at pH 9.6 was filtered, then rinsed with a small quantity of cold water. The filter cake was dispersed in about 8 l. of water containing 32 g. sodium silicate. This lignin solution or dispersion was heated up to 82°C. then acidified with 10% sulfuric acid to about pH 4. The suspension was filtered immediately. After rinsing with warm water, the filter cake at about pH 4.7 was redispersed in fresh water, heated up to 90°C. and filtered. This treatment removed additional coloring matter from the lignin.

The filter cake was dispersed again in 8 l. of water, heated up to 92°C. under nitrogen and the suspension was adjusted to about pH 3 with dilute hydrochloric acid. The suspension was filtered immediately. The pH of the filter cake increased to about 4.5 after rinsing with warm water. The filter cake was then dried to less than 1 % moisture in a forced air oven at 130°F. overnight (No. 1).

Another example was carried out on CIP Modified Kraft black liquor in which the lignin product was obtained by the same stepwise reduction in pH but sodium silicate was omitted (Nos. 2 and 3).

The SBR vulcanizate reinforced with these lignin products had the following physical properties

TABLE XI

| No. | Cure at 275°F. min. | Modulus (300%) | $T_B$ | $E_B$ | H | |
|---|---|---|---|---|---|---|
| 1 | 30 | 450 | 2850 | 800 | 58 | |
| 2 | 30 | 320 | 2725 | 900 | 53 | no sodium silicate |
| 3 | 33 | 400 | 2750 | 840 | 55 | |

Lignin-latex coprecipitates are conventionally formed by acidifying a suspension of sodium lignate and rubber latex. The suspension is then heated up to an elevated temperature to coagulate the precipitate and improve the filtering rate. The system still contains a colloidal suspension which retards the filtering rate. The filtrate is frequently "muddy" and the filter cake remains sticky thus impeding the washing and the subsequent drying of the filter cake. We have discovered that the filtering, and drying rates of lignin-latex coprecipitates, without the appearance of muddy filtrates, are greatly improved by laundering and conditioning the lignin as described above. After the laundering treatment and controlled coprecipitation, the filtrate is clear, indicating losses of rubber and of lignin through the filter, manifested by the appearance of muddy filtrates, are eliminated. Illustrations of this aspect of the invention are given in Examples 15–17.

EXAMPLE 15

About 200 g. Indulin AT from group C was soaked in water for about 1 hr. The suspension was adjusted to pH 2.5 with sulfuric acid, allowed to soak for a further period of 3 hours, and filtered. The filter cake was dispersed in 8 l. of water. The dispersion was filtered under suction immediately after heating up to 90°C, while stirring, in order to remove further quantities of water-soluble of-dispersible impurities. The filter cake was rinsed with 6 l. of warm water, dispersed in 4 l. of water, and while stirring the lignin was dissolved with a solution containing 20 g. NaOH and 16 g., N grade sodium silicate. About 750 ml. latex (20% rubber) was added and the system (diluted to about 10 l.) heated with steam up to 92°C. While stirring the sodium lignate-latex solution was precipitated with dilute hydrochloric acid to pH 2.6. The lignin-latex coprecipitate containing about equal proportions of lignin to rubber in about 13.5 l. of water filtered under vacuum within 3 minutes at 91°–92°C using 33 cm. dia. creped filter paper. The filtrate was clear. The filter cake was rinsed with 12 l. of warm water in order to remove soluble salts (this required about 10 minutes). The pH of the filter cake was about 4.4 after the rinsing step. The lignin-latex filter cake containing about 21% solids dried to less than 1 % moisture at 140°F overnight. A piece of filter cake about 2 cm. thick weighing about 25 g. dried at a rate of 3.6 g/hr. (weight loss) at 95°C.

EXAMPLE 16

About 200 g. Indulin AT from Group C was soaked in 3 l. of water for 1 hour. The lignin suspension was treated as in Example 15, with the exception that the washing or laundering step was omitted. While stirring the lignin-latex solution was precipitated with dilute hydrochloric acid down to pH 3.0 at 92°C. The 1:1 lignin-rubber coprecipitate contained in 13.5 l. of water required 33 minutes to filter. The filtrate was Muddy. It required 100 minutes of filtering time to rinse the filter cake with only 6 l. of warm water. A sample of filter cake about the same dimensions as in Ex. 15 dried at a rate of 3.0 g/hr. at 95°C.

An aliquot portion of the muddy filtrate was stored in a closed container. After about 2 months storage the disperse phase settled. It was filtered, washed free of salts then dried at 95°C. The loss of fine material through the filter was about 4 % based on the weight of the dried lignin-latex coprecipitate product.

EXAMPLE 17

About 200 g. Indulin AT from group B were soaked for 11 days in 3.5 l. of water adjusted with $H_2SO_4$ to pH 3.1. The supernatant liquid was decanted. The residue was dispersed in about 8 l. of water then heated while stirring up to 60°C. The lignin suspension was filtered immediately under suction. The filter cake was rinsed with 6 l. of warm water.

The filter cake was dispersed in 4 l. of water at about 42°C, and the lignin dissolved with a solution containing 20 g. NaOH and 20 g. N grade sodium silicate. About 2000 ml. latex were added (400 g. rubber) and the system while stirring was diluted with water to about 10 l. The system was precipitated with dilute hydrochloric acid down to pH of 3.0 at 92°C. The suspension containing about 168 parts lignin filtered with a clear filtrate at a rate of 4.7 litres/min. The filter cake was washed with 12 l. of warm water in order to remove excess soluble salts. This required 10 minutes to filter. The filter cake indicated a pH of 4.2 after the rinsing step. It was dried at 140°F. Other similar runs were made as in Table XII.

A comparison of the physical properties of the vulcanizates obtained with the laundered and unlaundered lignin samples are shown in Table XII. In all cases the vulcanizates contained 40 parts lignin per hundred of rubber (phr).

Lignin-latex coprecipitates showing excellent reinforcing properties for rubber were also obtained using the lignin in the form of the sodium salt separated from Kraft black liquor. The lignin-latex solution was coprecipitated in a stepwise reduction in pH without actually dissolving the lignin with alkali. Savings in time and chemicals are anticipated by this technique.

Acidification of any of the commercial black liquors from the alkaline pulping of wood will yield an alkali lignin containing variable amounts of alkali-insolubles as impurities. These impurities if sufficiently large lead to flaws in the vulcanizates. However, removal of the coarse insoluble particles is possible by centrifuging the black liquor before acidification, and further laundering is carried out during the coprecipitation.

This method for incorporating lignin from black liquor with rubber latex is illustrated in Examples 18–19.

TABLE XII

The behaviour and physical properties of lignin — latex coprecipitates

| Starting Ratio Lignin:Rubber | Lignin Group | Filtering rate | Washing of Coppt. | Drying rate at 95°C | Cure time Min. | 300% Modulus | $T_B$(psi) | $E_B$ | H |
|---|---|---|---|---|---|---|---|---|---|
| 100:100 | Group C[1] | 0.4 l/min[3] | 6 l/100 min | 3.0 g/hr | 40 | 470 | 2820 | 780 | 61 |
|  |  |  |  |  | 50 | 640 | 2575 | 720 | 63 |
| 100:100 | Group C[2] | 4.5 l/min[4] | 10 l/10 min | 3.6 g/hr | 40 | 900 | 3500 | 670 | 72 |
| 100:100 | Group B[2] | 4.8 l/min[4] | — | — | 40 | 500 | 3220 | 740 | 67 |
|  |  |  |  |  | 50 | 570 | 3400 | 710 | 67 |
| 50:100 | Group B[2] | 4.7 l/min[4] | 12 l/10 min | — | 40 | 675 | 3200 | 800 | 75 |
|  |  |  |  |  | 60 | 720 | 3500 | 720 | 79 |
| 40:100 | Group B[2] | 3.2 l/min[4] | 10 l/18 min | — | 40 | 475 | 2950 | 850 | 68 |
|  |  |  |  |  | 60 | 580 | 3150 | 760 | 72 |
| 100:11 | Group C[2] | —[4] | — | 3.7 g/hr | 30 | 520 | 2950 | 740 | 60 |

[1]The lignin was unlaundered.
[2]The lignin was laundered.
[3]Filtrate was muddy.
[4]Filtrate was clear.

EXAMPLE 18

Abour 4 l. of Spruce black liquor containing about 10% solids was heated with stirring up to 95°C, in the presence of 10 g. sodium chloride. After cooling to room temperature the black liquor was centrifuged in order to separate out insoluble matter. The clear liquor was heated up to about 88°C, and the lignin was precipitated by passing $CO_2$ through the system while cooling to room temperature. The suspension at about pH 9.4 was filtered at room temperature under vacuum. Rosin acids, tall oils, etc. (if any present) remain in solution with the mother liquor (as the filtrate). Sodium chloride depresses the solubility of the sodium lignate, thus avoiding blinding of the filter paper. The filter cake was washed with a small volume of cold water to remove further quantities of water-soluble impurities entrapped with the filter cake. Hot water dissolves the sodium lignate leading to blinding of the filter paper and/or loss of lignin product.

The lignin-rubber latex coprecipitate was prepared in the following fashion.

An aliquot portion of the sodium lignate filter cake containing circa 200 g. solids was dispersed in about 8 l. of water containing 24 g. sodium silicate. About 1200 ml rubber latex (18.2% rubber by weight) was added. The suspension was heated with stirring up to about 85°C, then neutralized with a 10% sulfuric acid solution from about pH 10.3 to pH 3.9. The precipitate was filtered immediately under suction using a 33 cm. dia. creped filter paper. At this stage the filtering rate was about 0.75 l/min. The filtrate was very dark, but free from Muds. The blondish filter cake was rinsed with a l. of warm water in order to remove excess salts and colored matter. The filter cake was leached further by dispersing it in about 8 l. of water, heated up to 87°C, and filtered again under suction. The filter cake was soaked in 8 l. of water overnight. It was then heated up to 92°C, and finally acidified with 1:1 hydrochloric acid from about pH 6.1 to pH 3.0. The suspension was filtered under suction at about 92°C. The filtering rate was now about 3.4 l./min. The pH of the filter cake increased to about 4.9 after rinsing with warm water. The filter cake containing about 30.7% solids dried overnight to less than 1% moisture in a forced air oven at 140°f. A 35 g. sample of filter cake about 2 cm. thick dried at a rate of 3.6 g/m at 95°C. The lignin-rubber coprecipitate contained about 70 parts lignin phr. It had an apparent surface area of 6.2 $M^2/g$.

The reinforcing capacity of this coprecipitate diluted to 40 parts lignin phr with SBR was:

TABLE XIII

| Time of Cure at 275°F | 300% Modulus | $T_B$ (psi) | $E_B$ | H |
|---|---|---|---|---|
| 60 min. | 670 | 3000 | 750 | 72 |

EXAMPLE 19

A 4 l. portion of Spruce black liquor was treated as in example 18. An aliquot portion of the sodium lignate filter cake was dispersed in about 8 l. of water containing 20 g. N grade sodium silicate. About 1000 ml latex (18.2% solids) was added. The system was heated while stirring up to about 85°c, then acidified with 10 % sulfuric acid to pH 3.9. the suspension was filtered immediately under suction. The filtering rate was about 1.7 l/min; the filtrate was dark but clear. After rinsing the filter cake with warm water, it was dispersed in 8 l. of water, heated while stirring up to 91°–92°C, and the pH adjusted with 1:1 hydrochloric acid from about 4.6 down to pH 3.0. The suspension was filtered immediately under suction. After rinsing the filter cake with warm water, the pH increased to 4.3. The filter cake containing 100 parts lignin to 100 SBR dried to less than 1% moisture in a forced air oven at 147°F.

The reinforcing capacity of the coprecipitate diluted with SBR to 40 parts lignin phr was:

TABLE XIV

| Time of Cure at 275°F | 300% Modulus | $T_B$ (psi) | $E_B$ | H |
|---|---|---|---|---|
| 30 min. | 485 | 2900 | 770 | 68 |
| 35 min. | 550 | 3400 | 760 | 67 |

The initial lignin-rubber coprecipitate (after washing it with water to remove excess salts) is dried and the remaining ingredients of the rubber recipe are usually added on the mill. The processing on the mill is rather lengthy, while the homogenization of the ingredients with the rubber is not too good.

We have also found that the ingredients of the rubber recipe can be mixed (dry or slurry or paste) with the wet coprecipite filter cake more efficiently before drying. The mixing can be effected in either the slurry or paste condition i.e. the amount of water present is not critical. The subsequently dried lignin-latex coprecipitate containing the ingredients of the rubber recipe can then be molded directly, or if oil-extension is desired, this can be done on the mill with several minutes of milling time only. The vulcanizates obtained are more uniform in tensile strength.

EXAMPLE 20

About 200 g. of Indulin AT were soaked in water at room temperature for about 1 hour. The suspension was filtered and rinsed under suction with 6 l. of water. Further quantities of water-soluble or water-dispersible impurities were removed by suspending the filter cake in about 8 l. of water heated up to 92°c and filtering immediately.

The filter cake was dissolved with 10% sodium hydroxide based on the weight of the dry lignin. The solution was diluted to 8 l. with water containing 32 g. N grade sodium silicate. About 1885 ml. SBR rubber latex (circa 20% rubber by weight) was mixed with it, and the system steam-heated while stirring up to 92°C. It was precipitated at 92°C by acidification with dilute HCl from about pH 11 down to pH 3. The suspension was filtered immediately, and washed with warm water in order to remove excess salts.

| The following ingredients, (B), | |
|---|---|
| PBNA | 7 g. |
| Litharge | 7 g. |
| Altax | 3.5 g. |
| Cumate | 1.05 g. |
| Sulphur | 7.0 g. |
| Zinc Oxide | 16.5 g. |
| Stearic Acid | 7 g. | were thoroughly mixed in a Waring blendor in the presence of about 500 ml. water. The lignin-rubber coprecipitate containing circa 40 parts lignin phr and the ingredients (B) were thoroughly mixed in 8 l. of water at about 25°C, and filtered again. The filter cake was dried at 140°–160°F in a forced air oven. This material can be molded under pressure with heat without milling. Also, it can be extended with oil on the mill as follows:

About 133 g. of the rubber composition formed above was cold rolled in the presence of 5 parts Circosol 42–40 and 2 parts of siland A174, as processing aids. The addition of the oil and sheeting out required about 5 minutes of milling time, compared to 10–15 min. where all ingredients were incorporated on the mill.

The physical properties of the SBR vulcanizates were:

TABLE XV

| Cure Time at 275°F | Modulus (300%) | $T_B$ (psi) | $E_B$ | H |
|---|---|---|---|---|
| 30 min. | 690 | 3320 | 730 | 74 |
| 35 min. | 730 | 3400 | 690 | 76 |

EXAMPLE 21

A similar lignin-latex coprecipitate containing the ingredients (B) was made as in example 20, but in the absence of N grade sodium silicate. The material was dried at 160°F. About 133 g. of this material was macerated by means of a Waring blendor, then sheeted as above with 5 parts Circosol 42-40 oil, but without the silane. The physical properties of the SBR vulcanizate were:

TABLE XVI

| Cure Time at 275°F | Modulus (300%) | $T_B$ (psi) | $E_B$ | H |
|---|---|---|---|---|
| 35 min. | 625 | 3280 | 810 | 72 |
| 40 min. | 720 | 3600 | 780 | 75 |

The lignin-rubber from Example 21, can be molded into light-colored reinforced rubber products.

The lignin products of this invention would give beneficial properties when incorporated as a reactive reinforcing filler in the preparation of phenol-, or urea-formaldehyde resins, or in other plastics.

This invention envisages in practice the use of less water than prior examples have indicated. Water conservation can be realized through counter-current washing steps on the precipitated lignin, using wash water in the preliminary laundering step, and other regenerating and recycling procedures obvious to those skilled in the art.

EXAMPLE 22

About 200 g. crude lignin were soaked for 24 hours in 3 l. water containing 5 g. NaCl and 14 ml. 20% $H_2SO_4$. The suspension at about pH 2.5 was filtered. The residue was dispersed in about 8 l. of water at 61°C and filtered. The filter cake was rinsed 5 times with 1 l. of water each time. The filter cake was dissolved in about 8 l. of water in the presence of 16% N grade sodium silicate with about 10% NaOH based on the weight of the original lignin, and precipitated at 92°C with dilute hydrochloric acid. The suspension at about pH 3 was filtered immediately. The filter cake was rinsed 5 times with 1 l. of water each time. The wet lignin was dried at 140°F overnight.

The physical properties of the vulcanizate filled with 40 parts lignin phr are:

TABLE XVII

| Modulus at 300% | $T_B$ | $E_B$ | H |
|---|---|---|---|
| 420 | 3030 | 790 | 59 |

EXAMPLE 23

About 200 g. crude lignin were soaked in 3 l. of water at about pH 2.8 for several days. The supernatant liquid was decanted. The residue was rinsed with 500 ml. water. The lignin was dissolved with sodium hydroxide in the presence of sodium silicate, and precipitated as in Example 22. The precipitate was rinsed twice with 1 l. of water each time (instead of 10 – 12 l. of water). The lignin was dried and milled into rubber as before. The physical properties of the vulcanizate are:

TABLE XVIII

| Modulus at 300% | $T_B$ | $E_B$ | H |
|---|---|---|---|
| 400 | 2900 | 790 | 59 |

We claim:
1. A polymeric material reinforced with a purified reformed amorphous lignin prepared by steps comprising
   a. aqueous extracting an impure crude lignin at water temperatures below about 95°C and pH below about 6, and separating the lignin solids from the aqueous phase,
   b. dissolving or dispersing the lignin in alkaline or neutral water, respectively, and reforming the lignin by one of (i) precipitating at a pH of about 2 to about 3 at a temperature of about 88° to 95°C; and (ii) soaking wet lignin solids at said pH and temperature as in (i) and separating the lignin solids from the aqueous phase at said temperature, and
   c. washing the reformed lignin to remove soluble material and drying, the lignin having a surface area of about 36 to about 52 $M^2/g$.

2. The polymeric material of claim 1 wherein the polymer is rubber.

3. The rubber material of claim 2 in the form of a lignin-rubber latex coprecipitate of improved filtering and drying properties, the coprecipitation occurring during the final precipitation and reforming (b) (i) of the lignin.

4. The lignin-rubber latex coprecipitate of claim 3 including rubber compounding ingredients incorporated into the wet coprecipitate.

5. The lignin-rubber latex coprecipitate of claim 3 wherein the rubber is a styrene-butadiene rubber.

6. A method of reinforcing rubber comprising incorporating therein a purified reformed amorphous lignin prepared by
   a. aqueous extracting an impure crude lignin at water temperatures below about 95°C and pH below about 6, and separating the lignin solids from the aqueous phase,
   b. dissolving or dispersing the lignin in alkaline or neutral water, respectively, and reforming the lignin by one of (i) precipitating at a pH of about 2 to about 3 at a temperature of about 88° to 95°C; and (ii) soaking wet lignin solids at said pH and temperature as in (i) and separating the lignin solids from the aqueous phase at said temperature and c. washing the reformed lignin to remove soluble material and drying, the lignin having a surface area of about 36 to about 52 M²/g.

7. The method of claim 6 wherein the lignin is milled into the rubber.

8. The method of claim 7 wherein the milling is carried out in the presence of a dispersing aid selected from liquid vinylic silanes and fatty acid esters.

9. The method of claim 6 wherein the lignin and rubber latex are coprecipitated during the final precipitation and reforming (b) (i) of the lignin.

10. The method of claim 9 wherein before drying the lignin-latex coprecipitate, rubber compounding ingredients in the form of a dry mix, slurry or paste are mixed with the wet coprecipitate.

* * * * *